Sept. 12, 1950            A. VANG            2,521,955
HIGH-FREQUENCY RADIANT HEATING
Filed July 1, 1948
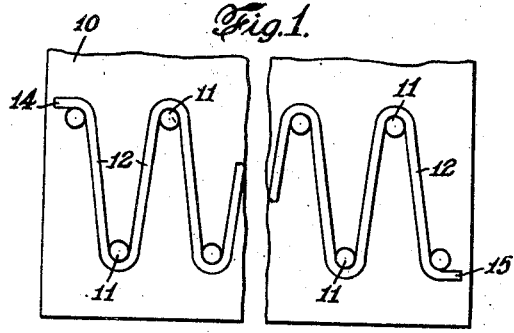
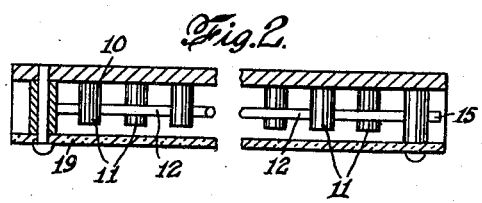
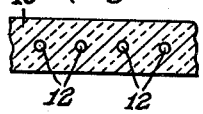
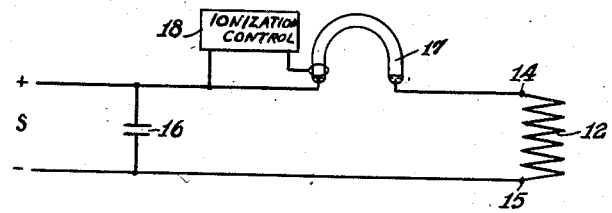
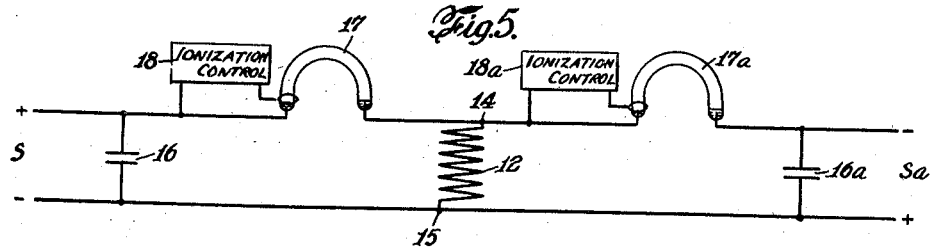
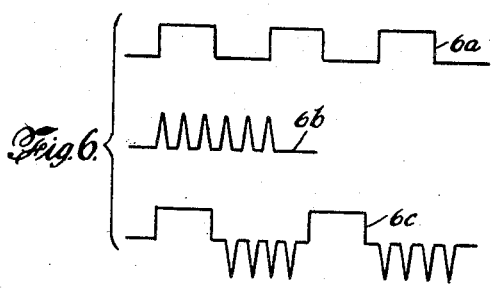
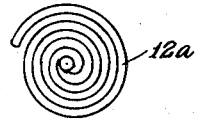
INVENTOR.
ALFRED VANG
BY Peter M. Boesen
ATTORNEY Patented Sept. 12, 1950

2,521,955

UNITED STATES PATENT OFFICE 2,521,955

HIGH-FREQUENCY RADIANT HEATING

Alfred Vang, New York, N. Y.

Application July 1, 1948, Serial No. 36,338

9 Claims. (Cl. 219—47)

This invention relates to radiant heaters and to means and methods for increasing the efficiency thereof.

It has been found that human comfort in heated enclosed spaces is dependent on a number of factors which when disregarded result in considerable waste of energy. It is well known that air of low relative humidity must be kept at a higher temperature to insure the same comfort that would be obtained at a higher humidity and lower temperature. However, the economy of heating the air is not greatly altered when the humidity is raised due to the fact that the specific heat of air increases with the moisture content. Furthermore, ventilation is desired by some people for psychological reasons even when the oxygen supply is adequate and no objectionable gases or vapors are present. Hence the maintainance of the ambient air temperature even as low as 70° F. entails considerable waste when the primary object is to keep only the human body warm.

Attempts have been made to maintain comfort by the use of hot water radiators having a large surface which may be radiantly "seen" from substantially all directions by the body to be heated. Such installations have required large radiant surfaces and consequently there has been much heat lost due to heating of the air by conduction and convection. Furthermore such systems are always a potential source of water damage. This is due partly to thinness of the walls of the water conduits required if the advantages of radiant heating are to be obtained. If the walls are thick a considerable length of time is required to bring the water conduits up to useful radiating temperature.

One object of this invention is to provide the almost instant establishment of radiant heating for a room.

Another object is to provide electrical radiant heating for a room both by resistance heating and induction heating.

Still another object is to provide a source of current which will improve or increase the efficiency of resistance and induction heaters.

The inventive features for the accomplishment of these objects are shown in connection with a heating system comprising an inductive and resistance heater and means for applying unidirectional pulses of current through the heater and means for applying similar pulses thereto but of different frequency and opposite direction.

In the accompanying drawing showing, by way of example, several of many possible embodiments of the invention:

Figure 1 shows the heater mounted on a wall.

Figure 2 shows a transverse section of the wall and heater.

Figure 3 shows a modification of the heater mounting.

Figures 4 and 5 are schematic representations of means for energizing the heater.

Figure 6 shows wave forms of current produced by means of Figures 4 and 5 and

Figure 7 shows a modification of the heater.

The invention comprises a wall 10 of a room provided with outstanding insulator knobs mounted thereon in a staggered pattern over the lower portion of the wall, such as in a row about the height of the bodies to be heated within the room, and in another row near the floor. Of course the location may be varied widely according to the use of the room. A resistive cable, wire, or conductive heating element 12 is secured to the knobs, in say, a zig-zag manner. The terminal end portions 14 and 15 of the element are connected to the respective sides of a condenser 16 which may be charged from a suitable source of current S connected thereto. A mercury arc tube switch 17 is interposed between the element 12 and the condenser 16 and conventional means 18 are provided for ionizing the contents of the tube at periodic intervals so that the condenser 16 may be discharged through the element 12 with a wave form approaching, or substantially as shown at 6a, a squared wave. If the frequency is increased to a much higher degree the wave form becomes a succession of peaks as shown in the wave form 6b. Because of the higher frequency, the inductive heating effect of the current of 6b will be greater than that of the current of 6a.

During intervals between pulses of current from the condenser 16 a current of reverse pulses may be passed through the element 12 in the opposite direction so that the wave form of current in the element may be as shown at 6c. The interval may be, say, as long as the duration of the pulse from the condenser 16 or longer if desired to balance resistance or inductive heating effects.

Such a current may be obtained by the use of a second source of pulses of opposite polarity connected to the element. Thus a separate condenser 16a and a suitable source Sa for charging same may be connected in parallel to the element 12 through the medium of a second arc tube 17a which is controlled by the ionization control 18a as shown in Figure 5.

By using pulses of inverse current interspersed between a lower frequency "forward" current a smaller wire or element may be used. This is due to the fact that the average forward or resistance heating current is lower than its maximum value. In between the large pulses of resistance heating current the high frequency inverse current heats the surrounding bodies by induction and the element itself is not heated to the same degree as in resistance heating. Of course it is not absolutely necessary that the high frequency current be of opposite direction but such is preferred to reduce danger of permanently magnetizing objects in a unidirectional magnetic field. The frequency of pulses may vary widely, for example the discharge of condenser 16 may be at low frequency say 60 to 100 C. P. S. and that of condenser 16a at high frequency say 500 to 10,000 C. P. S.

For safety and appearance a glass panel 19 may be mounted on the wall to cover the element. The panel is preferably of ground or prismatic glass to scatter the visible and infra-red rays both to conceal the elements and to diffuse the heat rays over a wider area. The wall 10 may be provided with reflecting surfaces to direct the heat radiation away from the wall.

While radiant heating is more efficient when the heating element is optically exposed, conductive heating of the wall may be desired, such as for prevention of freezing of water pipes therein. Hence the element 12 may be imbedded in the wall itself as in Fig. 3, and the whole wall becomes a radiator. The shape of the heating element may be varied according to the intended use of the room and form of current utilized depending on whether resistance heating or induction heating is to predominate. The element may assume a coiled shape as at 12 of Figure 7.

While I have generally referred to installations with respect to walls it is to be understood that, while preferably, the mounting is not limited to vertical walls and includes horizontal walls or floors and ceilings.

The invention claimed is:

1. A method for heating an electrical wire-like heater element comprising passing through the element a series of unidirectional pulses of current of substantially one frequency, and at the intervals between said pulses passing a second current of different frequency through the element.

2. A method of heating a wire-like heater element comprising passing a series of low frequency unidirectional pulses of current through the element, and during the intervals between the pulses passing a reverse current of high frequency unidirectional pulses through the element.

3. A method for heating materials near an electrical inductive heating element comprising passing several series of high frequency pulses through said element to inductively heat said bodies, and between said series passing a pulse of longer duration than any of said pulses through the element to heat the element by resistance heating.

4. In combination, a structure enclosing a space adapted to contain bodies to be heated, an electrically conducting heater element disposed on a wall of said structure within the space, means for passing a series of unidirectional current pulses through said element in one direction, and means for passing a series of pulses through the element in the opposite direction at a different frequency.

5. In combination, structure having walls enclosing a space adapted to contain bodies to be heated, electrical heating means including a conductor having looped portions disposed on the walls, means for passing pulses of unidirectional current through said looped portions, and means for passing unidirectional pulses of different frequency through the loops during intervals between the first mentioned pulses.

6. A combination, as claimed in claim 5, and a translucent but not transparent panel covering said heating means.

7. A combination, as claimed in claim 5, said looped portions providing inductance in the circuit resulting from the means set forth.

8. In combination, structure having a wall and adapted to enclosing a space, an inductive electrical heating element disposed on the wall, means for passing series of high frequency unidirectional current through said element, and means for passing unidirectional pulses of current through the element in the opposite direction at different frequency and between said series.

9. An electrical resistance and inductive heating element having terminal end portions, a source of direct current connected to said end portions, a condenser across said source, a second source of direct current connected to said end portions in reversed polarity from the first source, a condenser across the second source, two mercury arc tube switches each interposed between the element and the respective sources, and means for independently ionizing the contents of each tube switch.

ALFRED VANG.

REFERENCES CITED

The following references are of record in the file of this patent:

UNITED STATES PATENTS

| Number | Name | Date |
| --- | --- | --- |
| 1,592,388 | Slepian | July 13, 1926 |
| 1,802,677 | Slepian | Apr. 28, 1931 |
| 2,088,490 | Slepian | July 27, 1937 |
| 2,163,993 | Dufour et al. | June 27, 1939 |
| 2,287,542 | Vang | June 23, 1942 |
| 2,351,439 | Livingston | June 13, 1944 |
| 2,390,559 | Sherman | Dec. 11, 1945 |
| 2,406,884 | Mann et al. | Sept. 3, 1946 |
| 2,444,259 | Jordan | June 29, 1948 |